Figure 1:
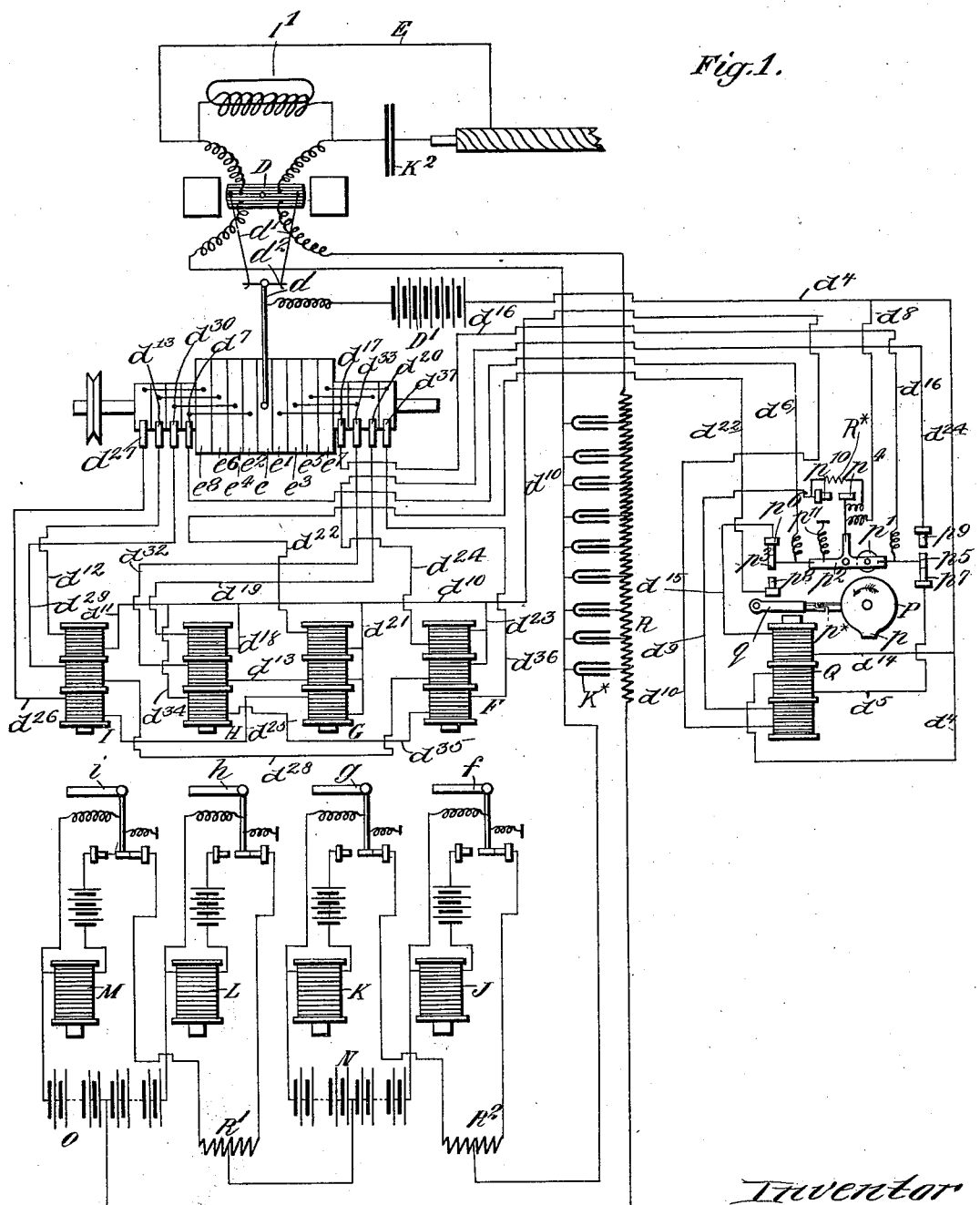
Figure 1A:
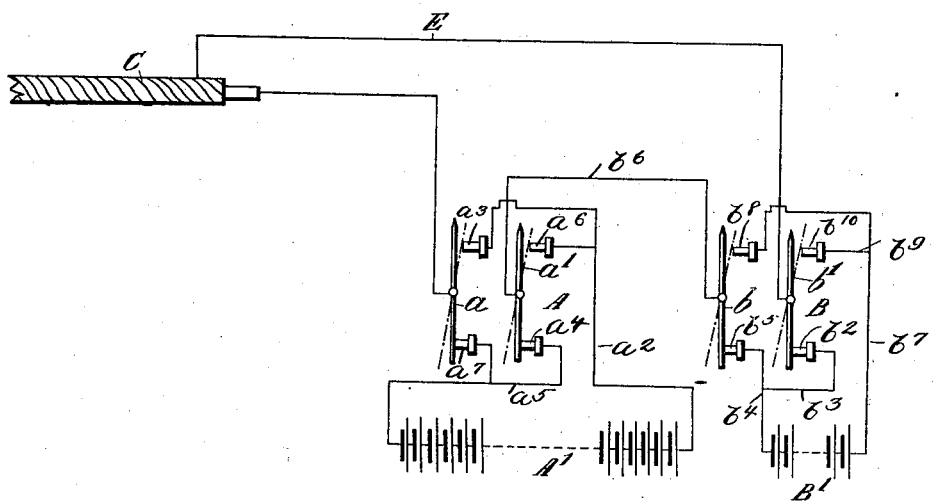

No. 703,892. Patented July 1, 1902.
S. G. BROWN.
ELECTRIC TELEGRAPHY.
(Application filed Nov. 5, 1900.)
(No Model.) 7 Sheets—Sheet 1.

Witnesses:
Dennis Sumby
Frank O Parker

Inventor
Sidney G. Brown
By James L. Norris
Atty

No. 703,892. Patented July 1, 1902.
S. G. BROWN.
ELECTRIC TELEGRAPHY.
(Application filed Nov. 5, 1900.)
(No Model.) 7 Sheets—Sheet 3.
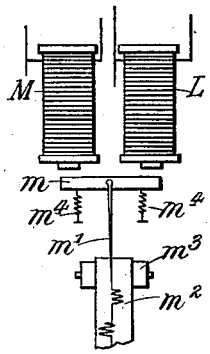
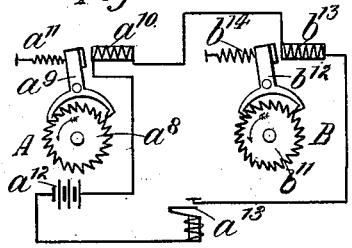
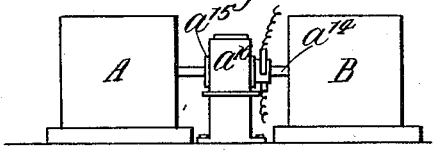
Witnesses:
Inventor
Sidney G. Brown No. 703,892. Patented July 1, 1902.
S. G. BROWN.
ELECTRIC TELEGRAPHY.
(Application filed Nov. 5, 1900.)
(No Model.) 7 Sheets—Sheet 4.

Witnesses
Inventor
Sidney G. Brown
By James L. Norris
Atty

No. 703,892. Patented July 1, 1902.
S. G. BROWN.
ELECTRIC TELEGRAPHY.
(Application filed Nov. 5, 1900.)
(No Model.) 7 Sheets—Sheet 5.

No. 703,892. Patented July 1, 1902.
S. G. BROWN.
ELECTRIC TELEGRAPHY.
(Application filed Nov. 5, 1900.)
(No Model.) 7 Sheets—Sheet 7.
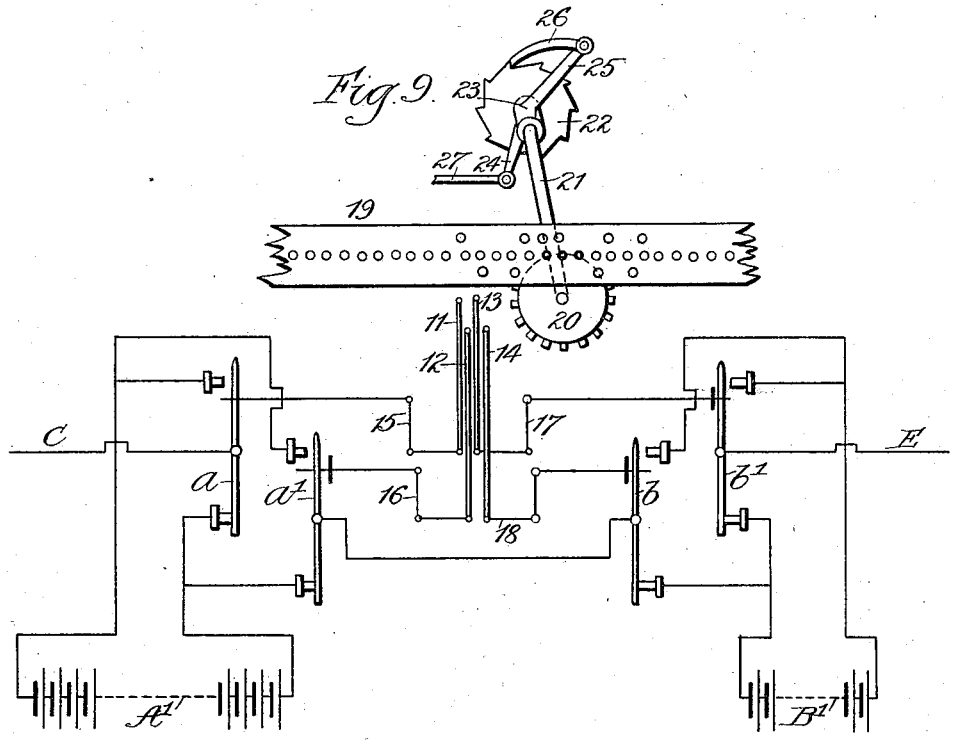

UNITED STATES PATENT OFFICE.

SIDNEY GEORGE BROWN, OF LONDON, ENGLAND.

ELECTRIC TELEGRAPHY.

SPECIFICATION forming part of Letters Patent No. 703,892, dated July 1, 1902.

Application filed November 5, 1900. Serial No. 35,541. (No model.)

*To all whom it may concern:*

Be it known that I, SIDNEY GEORGE BROWN, electrical engineer, a subject of the Queen of Great Britain, residing at 9 Putney Hill, Putney, London, England, have invented certain new and useful Improvements Relating to Electric Telegraphy, of which the following is a specification.

This invention relates to improvements in electric telegraphy, more especially applicable to submarine-cable circuits, and has for its object to increase the number of signals that may be transmitted over such a circuit in any given time.

According to my invention I may employ two or more transmitters, preferably automatic transmitters, at one end of the cable or line, which may at the same time respectively operate two or more receivers at the far end of the cable or line, each transmitter working its receiver without interfering with the other receiver. Such a system is termed "diplex telegraphy," and if the system is duplexed it is termed "quadruplex telegraphy." My invention is not, however, confined to a diplex or quadruplex system, but may be also applied to either simplex or duplex working, as will be readily understood from the following description.

For diplex telegraphy the two transmitters work their batteries in series with one another, they are kept in step, and their speed is kept as uniform as possible.

To keep the transmitters in step, they may either be mechanically coupled or electrically coupled. Electrical coupling when employed insures steady uniform running and may conveniently consist of a tuning-fork, adapted to send regular impulses of current for operating a polarized relay or its equivalent, fixed to each transmitter and working, say, a suitable escapement.

The transmitters may be driven by suitably-governed electromotor or by clockwork, as is well understood and described in the specification of Patent No. 577,540.

When employing my invention for diplex telegraphy, the electrical signaling power supplied to each of the transmitters is such that at the distant station a relay, siphon-recorder, or its equivalent may readily indicate by the amplitude of its motion whether one or the other, or both, of the transmitters have sent a signal. If both of the transmitters have sent a signal, this would be indicated by an amplitude of the movement of the tongue of the relay or siphon of the siphon-recorder which would be proportional to the sum or to the difference of the signaling electromotive forces of the transmitters. To facilitate the direct reading of such signals from the siphon-record, divisional lines may be drawn along the recording-paper parallel to and at such distances on either side of a central or "zero" line as to indicate every individual signal and also every combination of signals. Such divisional lines might advantageously be drawn by a roughly-synchronizing apparatus. For the same purpose transverse lines are also marked on the recording-paper. To minimize the chance of error, it is, however, of advantage to automatically split up and record the diplex signals by a suitable arrangement of relays. For this purpose any combination of relays may be used that can be operated, according to the strength of the arrival signaling-currents, the relays being so united as to work the receivers, so that may respectively indicate the signaling movements of the two transmitters.

A convenient form of receiving-relay for diplex working comprises a sectional rotary drum as described in the specification of my prior United States of America patent, No. 648,919, of May 8, 1900, this drum being divided into sections, the middle section being insulated and the remaining sections (on each side of said central section) being coupled up to secondary polarized relays, or their equivalent arranged, say, in two sets. The windings of these two sets of secondary relays receive their current through the aforesaid drum-sections and are so disposed that they will either be worked separately when the movement of the pointer of the receiving or drum relay has been given such amplitude by either of the transmitters working alone as to cause the said pointer to rest on one of the drum-sections applicable to such separate working, or the two sets of secondary relays will be worked both together (and two separate signals thus delivered) when the movement of the pointer of the receiving or drum relay has been given such amplitude by the two transmitters sending signals simultaneously as to cause the said pointer to rest on one of the drum-sections arranged to receive it upon the arrival of a signaling impulse equal to the sum or difference of the signaling electromotive forces of the transmitting-batteries. Each of the two sets of secondary relays works recording instrument separate from that of the other set. Such recording instrument may be a siphon-recorder or a direct writer or even an automatic instrument for retransmission or translation, such as an automatic perforator or an interpolater.

It is obvious that in the diplex system the two transmitters may be combined so as to form a single instrument operated by means of a single tape run, say, at a greater speed than when two tapes are employed.

In order to prevent the pointer or tongue of the receiving-relay from operating all the secondary relays controlled, respectively, by the drum-sections over which it may sweep before reaching its point of maximum deflection, I connect the secondary relays to the receiving-relay through the intervention of a contact-maker. Such contact-maker may run synchronously, or approximately so, with the transmitters and be adapted to close the circuit between the receiving and secondary relays at or about the middle of every signal. In this manner the secondary relays or the instruments they work are coupled up to the receiving-relay only when the pointer or tongue of the receiving-relay has attained its maximum deflection due to any given signaling impulse. This contact-maker may be driven by a phonic wheel and tuning-fork or equivalent device provided with suitable means for adjusting the speed of rotation and the position of the time of contact, as described in chapter X, page 205 of "*Telegraphy*," by Preece and Sivewright.

It is obvious that if the diplex system is to be of practical value the signals as applied to the receiving-relay must be cleared of secondary or disturbing electrical effects. For this purpose any convenient means may be employed, such as shunted or unshunted condensers placed in the line or cable, the use of curb-transmitters or closed-circuited magnetic shunts placed across the receiving-relay coil. For the same purpose there may be employed a local correcting-circuit including the receiving-relay and having resistance and capacity, such as an artificial line or a condenser, placed between two resistances, (the resistances and the condenser being capable of adjustment,) through which a correcting-current can be sent from the secondary relays or their equivalent and thence through the coil of the receiving-relay in order to neutralize upon the said coil the "varying-zero" effect due, as is well understood, to the charging or polarizing of the condensers in the line or cable by a series of signaling impulses of the same sign. For this purpose the receiving-relay may be provided with two coils—namely, a working coil and a governing-coil—the governing-coil being heavy and damped, say, by being wound on a metal frame or its equivalent, and the two coils being coupled together by springs and provided with means for passing a current through the local correcting-circuit, around the governing-coil for correcting the movement of the working coil due to varying zero if the signaling impulses are received through unshunted condensers, or for correcting the movement of the coil due to earth-currents if the signaling impulses are received through shunted condensers, or instead of having two separate coils a single coil consisting of two windings may be employed, one winding being shunted by the other winding and a closed-circuited magnetic coil being so arranged that steady earth-currents cannot move the coil, but that the bulk of the signaling-current will flow through one of the said windings and the coil will therefore be moved so as to work the local apparatus or relay, which in turn sends a current through a local correcting-circuit, having resistance induction or capacity or any required combination of these, and thence through the other winding of the coil, thereby counteracting any effects of the signaling-currents on the other of said windings.

In order that my invention may be clearly understood and readily carried into effect, I will proceed to describe the same more fully in connection with the accompanying drawings, in which—

Figure 2:
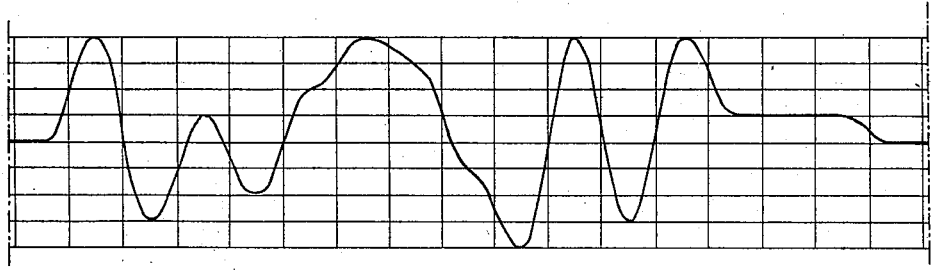
Figure 3:
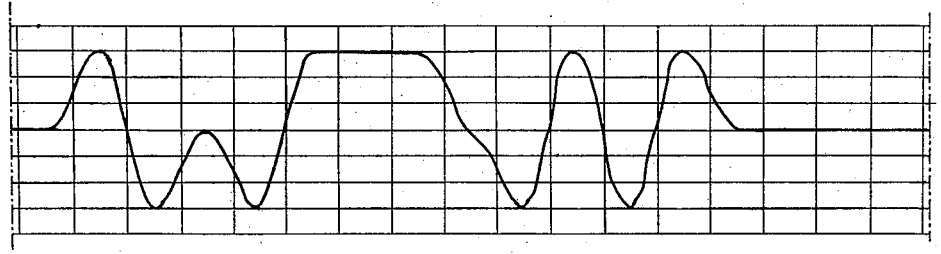
Figure 4:
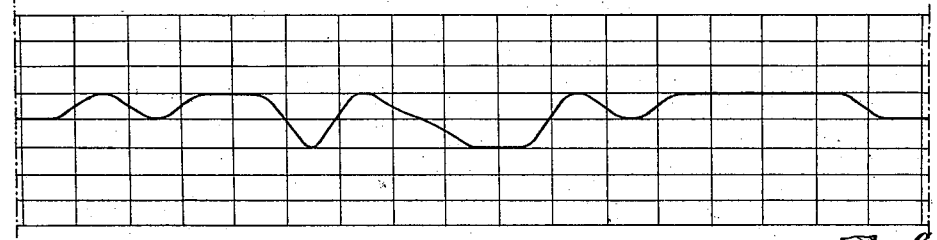
Figure 5:
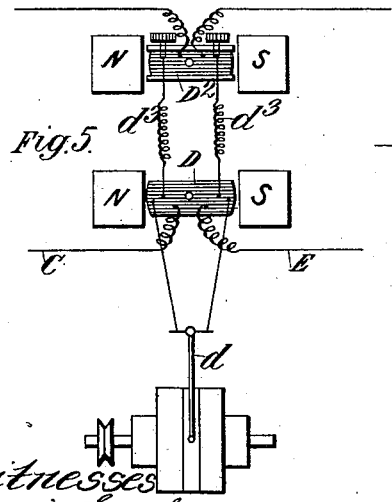
Figure 6:
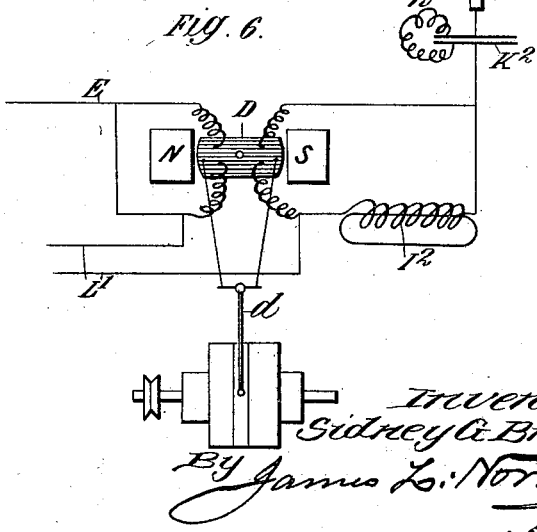
Figure 7:
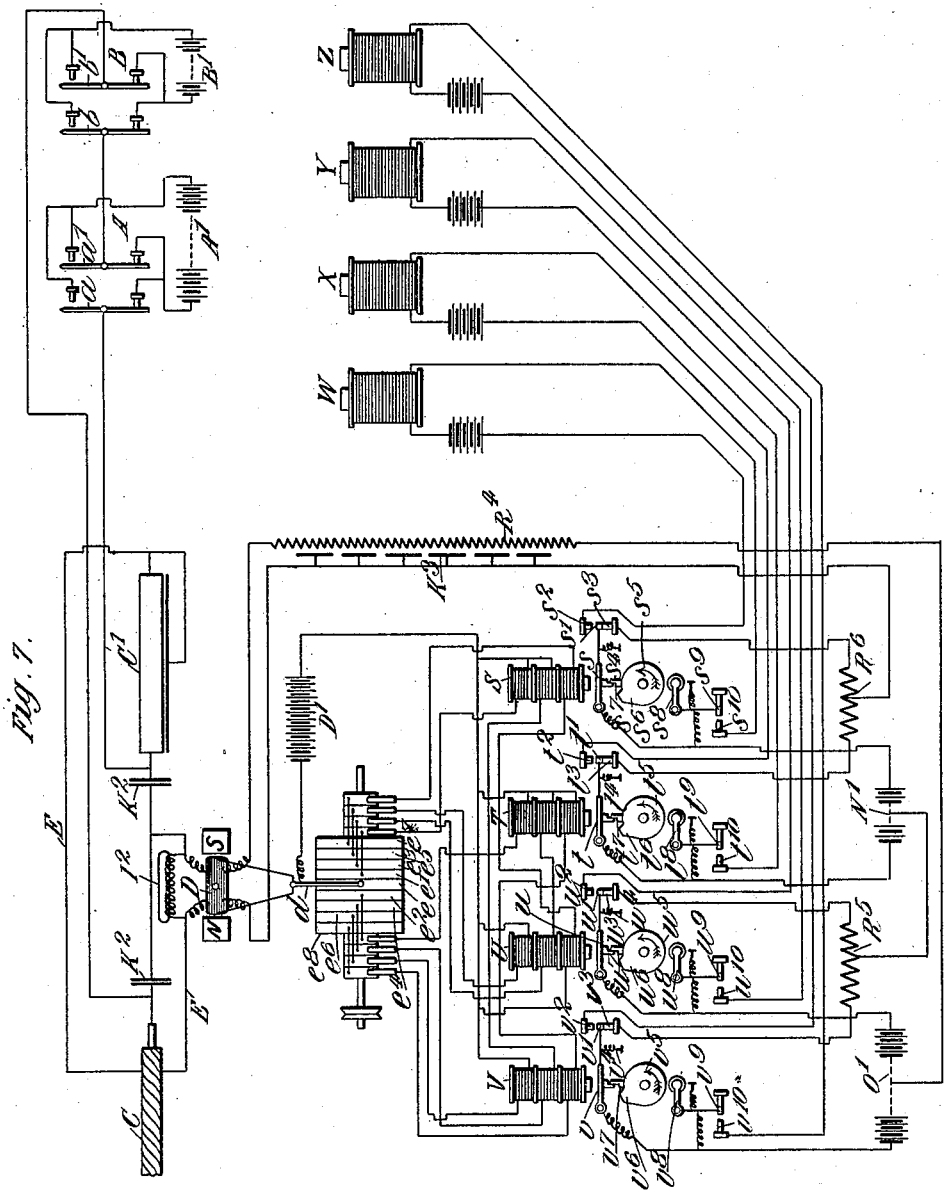
Figure 8:
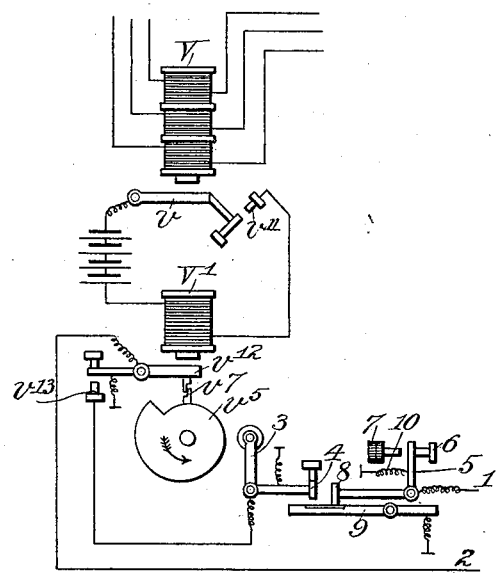

Figure 1 is a diagram of the apparatus at the receiving end of a cable-section, showing my invention applied to diplex telegraphy. Fig. 1$^a$ is a diagram of transmitting apparatus to be employed in conjunction with the receiving apparatus shown in Fig. 1. Fig. 1$^b$ shows an appropriate form of recording instrument. Fig. 1$^c$ shows a convenient method of electrically coupling the transmitters. Figs. 2, 3, and 4 are diagrams showing the nature of the signals received from the transmitters shown in Fig. 1. Figs. 5 and 6 are diagrams of modified arrangements for sending a local current for correcting varying zero in the receiving-relay. Fig. 7 is a diagram showing my invention applied to quadruplex telegraphy. Fig. 8 is a diagram of an electromagnetically-operated contact-maker for use with the apparatus shown in Fig. 7. Fig. 9 shows an arrangement whereby the two transmitters are operated by a single perforated tape. Fig. 9$^a$ is a diagram showing the transmitters mechanically coupled. Fig. 10 is a diagram showing the arrangement of the duplex bridge.

Referring to Figs. 1 and 1$^a$, A and B are two transmitting instruments, which may be automatic transmitters of the well-known type described in the specification of Patent No. 577,540, connected to a cable C and connected together for working their batteries in series with one another. These transmitters are kept in step and are run at as uniform a speed as possible. $a$ $a'$ are the contact-levers of the transmitter A, and $b$ $b'$ are the contact-levers of the transmitter B. The lever $a$ is connected to the cable C. The lever $b$ is connected to the cable C through the intervention of the levers $a'$ and $a$. The lever $b'$ is connected to earth E, and the lever $a'$ is connected to earth through the intervention of the levers $b$ $b'$. D is the coil of the receiving-relay, delicately suspended in a magnetic field and included in the cable-circuit. $d$ is the pointer or tongue of the receiving-relay, insulated from and connected to the coil D by cords $d'$ and a pivoted cross-piece $d^2$ and adapted to rest on the surface of a sectional rotary-drum contact of the kind described in the specification of United States of America Patent No. 648,919, of May 8, 1900. This drum consists of a central insulated section $e$, on which the tongue $d$ rests when in its zero position, and sections $e'$ $e^2$ $e^3$ $e^4$ $e^5$ $e^6$ $e^7$ $e^8$, insulated from one another and arranged four on either side of the section $e$. The drum-sections $e'$, $e^2$, $e^3$, $e^4$, $e^5$, $e^6$, $e^7$, and $e^8$ are connected, through the intervention of a contact-maker, with the electromagnets of secondary relays F, G, H, and I. When these electromagnets are energized, they respectively attract their armatures $f$, $g$, $h$, and $i$, thereby closing the circuits of the recording instrument, electromagnets J, K, L, and M or their equivalents. N and O are divided batteries arranged to be operated by the recording instruments for sending a current through a circuit (which I term the "local correction-circuit") including condensers K* and resistances R and the coil D, for correcting the movement of said coil to overcome what is known as a "varying zero" in the receiving-relay due to the gradual charging up of the condenser $K^2$, by series of signals of the same sign and the consequent loss of signaling-current, each side of the battery O being relatively to each side of the battery N as the battery A' is to the battery B', and the condensers K* and resistances R being arranged to afford the same time retardation to the local correcting-current from the batteries O and N as the charging-up effect of the cable C and condenser $K^2$, due to a series or combination of signals of the same sign, offers to the sending-batteries A' and B'. The currents from the batteries N and O pass through the coil D in the same direction as the signaling-currents. The condensers K* and resistances R should be of greater retardation than that of the cable C alone and of such retardation as to damp down the separate or single signaling movements of the secondary relays F, G, H, and I and to make the combined effect of many or a series of signals of the same polarity only felt in the coil D. Therefore the correcting or making-up current from the batteries O and N is slow in action and is not required for a single signal, but for a combination effect of many signals of the same polarity only. The contact-maker interposed between the receiving-relay and the secondary relays comprises a rotary clutch P, which may conveniently be of the kind described in the specification of my United States of America application, Serial No. 10,656, filed March 29, 1900, and is provided with a nose $p$ and a pin $p^*$. The cam P is normally held stationary by the armature $q$ of an electromagnet Q, which engages the pin $p^*$. When the magnet Q is energized, it causes the armature $q$ to release the pin $p^*$ and permit the cam P to rotate. As the cam P rotates the nose $p$ is adapted to strike a roller $p'$, carried by one arm of an insulated pivoted lever $p^2$, once during every revolution. The lever $p^2$ carries contact-pieces $p^3$ $p^4$ $p^5$. Every time the lever $p^2$ is rocked by the cam P it moves the contact-pieces $p^3$ and $p^5$ away from the fixed contacts $p^6$ and $p^7$ onto fixed contacts $p^8$ and $p^9$ and also moves the contact $p^4$ onto a fixed contact $p^{10}$.

$p^{11}$ is a spring which tends to maintain the lever $p^2$ in the position indicated in Fig. 1. The cam P runs synchronously with the transmitters, and the nose $p$ is adapted to operate the lever $p^2$ at the middle of every signal—that is to say, when the tongue $d$ has reached its point of maximum deflection. $K^2$ is the usual receiving-condenser. I' is a closed-circuited magnetic shunt for eliminating earth-currents from the coil D. The shunt I' has a resistance of, say, thirty ohms, and the coil D has a resistance of, say, five hundred ohms. Therefore all slow currents, such as earth-currents, flow through I', and the coil D is thus cleared of secondary or disturbing effects, while the quick signaling-currents affect the coil D. When a signaling impulse is sent to line or to earth, the current passes through the coil D and causes it to move in the magnetic field in which it is suspended, as is well understood, and to thereby operate the tongue $d$.

If the electric signaling power of the transmitter A is equal to, say, three and the electric signaling power of the transmitter B is equal to, say, one, when the lever A is moved into the position shown in dotted line a signaling-current of the value of three and of positive sign passes from the battery A', conductor $a^2$, contact $a^3$, and lever $a$ to the cable C through the coil D and back through earth E, the lever $b'$, contact $b^2$, conductors $b^3$ $b^4$, contact $b^5$, lever $b$, conductor $b^6$, lever $a'$, contact $a^4$, and conductor $a^5$ to the opposite pole of the battery A'. This signaling-current moves the coil D to a sufficient extent to cause the tongue $d$ to slide across the surface of the rotary drum to the section $e^6$, thus closing the circuit of the relay-battery D'. As the tongue $d$ sweeps across the section $e^2$ it closes the circuit of the battery D' through the conductors $d^4$ $d^{14}$, the top winding of the magnet Q, and thence through the conductor $d^{15}$, contacts $p^6$ $p^3$, conductor $d^6$, brush $d^7$, the section $e^2$, and the tongue $d$ back to the battery D'. The magnet Q is thus energized and attracts the armature $q$, which then releases the cam P. As the cam P then rotates the nose $p$ operates the lever $p^2$, as above described, and the current then passes from the battery D' through the conductors $d^4$ $d^8$, the contacts $p^4$ $p^{10}$, conductor $d^9$, the bottom winding of the magnet Q, and thence through the conductors $d^{10}$ $d^{11}$, the top winding of the magnet I, conductor $d^{12}$, brush $d^{13}$, section $e^6$, and tongue $d$ to the opposite side of the battery D'. The armature $i$ is thereby attracted, so as to close the circuit of the recorder-magnet M, which then records a signal, as hereinafter explained. Should a series of positive signals each of the value of three be thus transmitted, the condenser $K^2$ would gradually become charged up by a part of the current of such signals, and in order to cause the tongue $d$ to move across the receiving-relay sufficiently far to reach the section $e^6$ it would be necessary to make up for this loss of current. This is effected by means of the local correction-circuit, as follows: When the tongue $d$ is in its zero position, no correcting-current is sent from the batteries O and N through the local correcting-circuit, including the condensers $K^*$, the resistances R, and the coil D, the current from the battery O passing from one pole of said battery through the armature-lever $h$, the resistance R', and the armature-lever $i$ back to the battery O and the current from the battery N passing from one pole of said battery through the armature-lever $f$, the resistance $R^2$, and the armature-lever $g$ back to the opposite pole of the battery N. When the armature-lever $i$ is thus operated to close the circuit of the recorder-magnet M, current passes from one end of the battery O through the armature-lever $h$, resistance R', through both sides of the battery N, if both sides of this battery N are evenly balanced, through the armature-levers $g$ and $f$, the resistance $R^2$, the local correcting-circuit, including the coil D, in the same direction as the signaling impulses, and returns to the middle of the battery O. A current is thus sent through the coil D, which corrects any possible movement of the said coil due to the varying zero caused by the receipt of a number of signals of the same sign and duration tending to choke the receiving-condenser $K^2$. It should be noted that although this local correcting-current passes through the coil D in the same direction as the signaling-currents it has the opposite effect on the coil D to the effect produced by charging up of the condenser $K^2$ by a series of signaling impulses of the same polarity and strength reduces the signaling-currents, for part of said currents has been absorbed in charging the condenser, whereas the local correcting-current adds to the effect of the signaling-currents. When the lever $a'$ is moved into the position shown in dotted line, a signaling-current of the value of three passes from the battery A' through the conductor $a^2$, contact $a^6$, lever $a'$, conductor $b^6$, lever $b$, contact $b^5$, conductors $b^4$ $b^3$, contact $b^2$, and lever $b'$ to earth E and thence through the coil D, returning in the negative direction through the cable C, lever $a$, contact $a^7$, and conductor $a^5$ to the opposite side of the battery A'. The coil D is thereby caused to move the tongue $d$ onto the section $e^5$ of the rotary drum. As the tongue $d$ sweeps over the section $e'$ it closes the circuit of the battery D' through the conductors $d^4$, the middle winding of the magnet Q, the conductor $d^5$, the contacts $p^7$ $p^5$, the conductor $d^{16}$, brush $d^{17}$, section $e'$, and tongue $d$ to the battery D'. The magnet Q is thus energized and attracts the armature $q$, thereby releasing the cam P, so that the nose $p$ of said cam operates the lever $p^2$, as above described. A current then passes from the battery D' through the conductors $d^4$ $d^8$, contacts $p^4$ $p^{10}$, conductor $d^9$, bottom winding of the magnet Q, conductor $d^{10}$ $d^{18}$, top winding of the magnet H, conductor $d^{19}$, brush $d^{20}$, section $e^5$, and tongue $d$ to the battery D'. The armature $h$ is thereby attracted and closes the circuit of the recorder-magnet L. Should a series of these signals in the negative direction through the cable C and each of the value of three be thus transmitted, the condenser $K^2$ would gradually become charged up, and thereby cause a loss of the signaling-current, as above explained. This effect is overcome by the local correcting-circuit, as follows: When the armature-lever $h$ is operated, as above described, to close the circuit of the magnet L, current passes from the middle of the battery O through the local correcting-circuit, including the coil D, and returns through the resistance $R^2$, the armature-levers $f$ $g$, both sides of the battery N, if both sides of said battery are evenly balanced, leaves the middle of the battery N to the resistance R', and thence through the armature-lever $i$ to the battery O. A correcting-current is thus sent through the coil D in the same direction as the signaling-current and has the opposite effect on said coil to that produced by the charging up of the condenser $K^2$. When the signaling-lever $b$ of the transmitter B is moved into the position shown in dotted line, a signaling-current of the value of one and of positive sign passes from the battery B' through the conductor $b^7$, contact $b^8$, lever $b$, conductor $b^6$, lever $a'$, contact $a^4$, conductor $a^5$, contact $a^7$, and lever $a$ to the cable C through the coil D and returns by earth E, the lever $b'$, contact $b^2$, and conductors $b^3$ $b^4$ to the battery B'. The coil D is thereby caused to move the tongue $d$ onto the section $e^2$ of the rotary drum, a current passes from the battery D' through the conductors $d^4$ $d^{14}$, the top winding of the magnet Q, the conductors $d^{15}$, contacts $p^6$ $p^3$, conductor $d^6$, brush $d^7$, section $e^7$, and tongue $d$ to the battery D'. The magnet Q is thus energized and operates the armature $q$ so as to release the cam P. The nose $p$ then operates the lever $p^2$ and the contacts which it carries, as above described, so that a current then passes from the battery D' through the conductors $d^4$ $d^8$, contacts $p^4$ $p^{10}$, conductor $d^9$, lowest winding of the magnet Q, conductors $d^{10}$ $d^{21}$, top winding of magnet G, conductor $d^{22}$, contacts $p^8$ $p^3$, conductor $d^6$, brush $d^7$, section $e^2$, and tongue $d$ to the battery D'. The armature $g$ is thereby attracted and closes the circuit of the recorder-magnet K. Should a series of these positive signals each of the value of one be thus transmitted to the cable C, the condenser $K^2$ would gradually become charged up, and thereby cause a loss of the signaling-current. This loss is overcome by the local correction-circuit as follows: When the armature-lever $g$ is operated, as described, to close the circuit of the magnet K, current passes from one side of the battery N through the armature-lever $f$, resistance $R^2$, the local correction-circuit, including the coil D, in the same direction as the signaling-current, returns to the middle of the battery O, passes through both sides of the battery O, if both sides of said battery are evenly balanced, and thence through the armature-levers $i$ and $h$ to the middle of the battery N. When the signaling-lever $b'$ is moved into the position shown in dotted line, a signaling-current of the value of one passes from the battery B' through the conductors $b^7$ $b^9$, contact $b^{10}$, lever $b'$ to earth E, and the coil D, returning in the negative direction through the cable C, lever $a$, contact $a^7$, conductor $a^5$, contact $a^4$, lever $a'$, conductor $b^6$, lever $b$, contact $b^5$, and conductor $b^4$ to the battery B'. The coil D is thus caused to move the tongue $d$ onto the section $e'$, so that current passes from the battery D' through the conductor $d^4$, the middle winding of the magnet Q, the conductor $d^5$, contacts $p^7$ $p^5$, conductor $d^{16}$, brush $d^{17}$, section $e'$, and tongue $d$ to the battery D'. The magnet Q is thus energized and operates the armature $q$ so as to release the cam P. The nose $p$ of the cam P then operates the lever $p^2$ and the contacts which it carries, as above described, so that a current then passes from the battery D', the conductors $d^4$ $d^8$, contacts $p^4$ $p^{10}$, conductor $d^9$, lowest winding of the magnet Q, conductors $d^{10}$ $d^{23}$, top winding of the magnet F, conductor $d^{24}$, contacts $p^9$ $p^5$, conductor $d^{16}$, brush $d^{17}$, section $e'$, and tongue $d$ to the battery D'. The armature lever $f$ is thereby attracted and closes the circuit of the recorder-magnet J. Should a series of successive signals each of the value of one and in the negative direction be thus transmitted to the cable C, the condenser $K^2$ would gradually become charged up, and thereby cause a loss of signaling-current. This loss is overcome by the local correction-circuit, as follows: When the armature-lever $f$ is operated, as described, to close the circuit of the recorder-magnet J, current passes from the middle of the battery N through the resistance R', armature levers $h$ and $i$ to the middle of the battery O, and thence through the local correction-circuit, including the coil D, in the same direction as the signaling-current, returning through the resistance $R^2$ and armature-lever $g$ to the battery N. When the signaling-levers $a$ and $b$ are simultaneously moved into the positions shown in dotted line, a signaling-current of the value of four—i. e., three plus one—and of positive sign passes from the battery B' through the conductor $b^7$, contact $b^8$, lever $b$, conductor $b^6$, lever $a'$, contact $a^4$, conductor $a^5$, battery A', conductor $a^2$, contact $a^3$, and lever $a$ to the cable C and coil D, returning by earth E, lever $b'$, contact $b^2$, and conductors $b^3$ $b^4$ to the battery B. The coil D is thus caused to move the tongue $d$ onto the section $e^8$. The tongue $d$ in sweeping over the section $e^2$ closes the circuit of the battery D' and top winding of the magnet Q, as above described, thus energizing the said magnet and causing it to attract the armature $q$, thereby releasing the cam P, so that when the nose $p$ operates the lever $p^2$, as above described, a current passes from the said battery through the conductors $d^4$ $d^8$, the contacts $p^4$ $p^{10}$, the conductor $d^9$, bottom winding of the magnet Q, conductors $d^{10}$ $d^{20}$, the bottom winding of the magnet G, the conductor $d^{25}$, bottom winding of the magnet I, conductor $d^{26}$, brush $d^{27}$, section $e^8$, and tongue $d$ to the battery D'. The armature-levers $g$ and $i$ are thus caused to close the circuits of the recorder-magnets K and M. Should a series of signals each of the value of four and of positive sign be thus transmitted to the cable C, the condenser $K^2$ will gradually become charged up, and thereby cause a loss of signaling-current. This loss is overcome by the local correction-circuit, as follows: When the armature-levers $g$ and $i$ are operated, as described, to close the circuits of the recorder-magnets K and M, current passes from one side of the battery N through the armature-lever $f$, resistance $R^2$, the local correction-circuit, including the coil D, in the same direction as the signaling-current, returning to the center of the battery O and thence through the armature-lever $h$ and resistance R' to the middle of the battery N. When the levers $a$ and $b'$ are simultaneously moved into the positions shown in dotted line, a signaling-current passes from the battery A' through the conductor $a^2$, contact $a^3$, and lever $a$ to the cable C and coil D, returning through earth E, lever $b'$, contact $b^{10}$, conductors $b^9$ $b^7$, in the reverse direction through the battery B', the conductor $b^4$, contact $b^5$, lever $b$, conductor $b^6$, lever $a'$, contact $a^4$, conductor $a^5$ to the battery A'. Is will thus be seen that the battery B' opposes the battery A', and the signaling-current therefore has a value of plus three minus one, or two. The coil D then moves the tongue $d$ onto the section $e^4$ of the rotary drum. As the tongue $d$ sweeps over the section $e^2$ the circuit of the top winding of the magnet Q and the battery D' is closed, as above described, the magnet Q being thus energized and attracting the armature $q$ so as to release the cam P. When the nose $p$ then operates the lever $p^2$, as above described, a current passes from the battery D' through the conductors $d^4$ $d^8$, contacts $p^4$ $p^{10}$, conductor $d^9$, bottom winding of the magnet Q, conductors $d^{10}$ $d^{23}$, bottom winding of magnet F, conductor $d^{28}$, middle winding of magnet I, conductor $d^{29}$, brush $d^{30}$, section $e^4$, and tongue $d$ to the battery D'. The armature-levers $f$ and $i$ are thereby operated and close the circuits of the recorder-magnets J and H. Should a series of signals each of the value of two and of positive sign be thus transmitted to the cable C, the condenser $K^2$ will gradually become charged up, and thereby cause a loss of signaling-current. This loss is overcome of the local correction-circuit, as follows: When the armature-levers $f$ and $i$ are operated, as described, to close the circuits of the recorder-magnets J and M, current passes from one end of the battery O through the armature-lever $h$, resistance R', to the middle of the battery N, in the reverse direction through one side of the battery N, the armature-lever $g$, resistance $R^2$, the local correction-circuit, including the coil D, in the same direction to that of the signaling-current and back to the middle of the battery O. It will thus be seen that the battery N opposes the battery O in a corresponding manner to that in which the battery B' opposes the battery A'. If the levers $a'$ and $b$ are simultaneously moved into the positions shown in dotted line, a signaling-current passes from the battery A' through the conductor $a^2$, contact $a^6$, lever $a'$, conductor $b^6$, lever $b$, contact $b^3$, conductor $b^7$, in the reverse direction through the battery B', conductors $b^4$ $b^3$, contact $b^2$, and lever $b'$ to earth E, returning in the negative direction through the coil D and cable C to the lever $a$, contact $a^7$, and conductor $a^5$ to the battery A'. It will thus be seen that the battery B' opposes the battery A' and that therefore a current of the value of three minus one, or two, is sent to earth and returns by cable. This current may therefore be called a current in negative direction or a current of the value of minus two. The tongue $d$ is thereby moved onto the section $e^3$ of the rotary drum. As the tongue $d$ sweeps over the section $e'$ it closes the circuit of the battery D' and middle winding of the magnet Q, as above described, thereby releasing the cam P. The nose $p$ then operates the lever $p^2$, as above described, and current passes from the battery D' through the conductors $d^4$ $d^8$, contacts $p^4$ $p^{10}$, conductor $d^9$, bottom winding of the magnet Q, conductors $d^{10}$ $d^{21}$, middle winding of the magnet G, conductor $d^{31}$, middle winding of the magnet H, conductor $d^{32}$, brush $d^{33}$, section $e^3$, and tongue $d$ to the battery D'. The armature-levers $g$ and $h$ are thereby attracted and close the circuits of the recorder-magnets K L. Should a succession or series of signals each of the value of two and in the negative direction be thus transmitted, the condenser $K^2$ will gradually become charged up, and thereby cause a loss of signaling-current. This loss is overcome by the local correction-circuit, as follows: When the armature-levers $g$ and $h$ are operated, as above described, current passes from the center of the battery O through the local correction-circuit, including the coil D, in the same direction as the signaling-current, returning through resistance $R^2$, armature-lever $f$, in the reverse direction through one side of the battery N, from the center of the battery N to the resistance R', and thence through the armature-lever $i$ to the battery O. It will thus be seen that the battery N opposes the battery O in a corresponding manner to that in which the battery B' opposed the battery A'. When the signaling-levers $a'$ and $b'$ are simultaneously moved into the positions shown in dotted lines, current passes from the battery A' through the conductor $a^2$, contact $a^6$, lever $a'$, conductor $b^6$, lever $b$, contact $b^5$, conductor $b^4$, battery B', conductors $b^7$ $b^9$, contact $b^{10}$, and lever $b'$ to earth E, returning in the negative direction through the coil D and cable C to the battery A'. A signaling-current of the value of three and one, or four, is thus sent through the coil D in the negative direction, and may therefore be called a signaling-current of the value of minus four. The tongue $d$ is thereby moved onto the section $e^7$ of the rotary drum. In sweeping over the section $e'$ the tongue $d$ closes the circuit of the battery D' and the middle winding of the magnet Q, as above described, thereby releasing the cam P and enabling the nose $p$ to operate the lever $p^2$, as above described. Current then passes from the battery D through the conductors $d^4$ $d^8$, contacts $p^4$ $p^{10}$, conductor $d^9$, bottom winding of the magnet Q, conductors $d^{10}$ $d^{34}$, bottom winding of magnet H, conductor $d^{35}$, bottom winding of the magnet F, conductor $d^{36}$, brush $d^{37}$, section $e^7$, and tongue $d$ to the battery D'. The armature-levers $h$ and $f$ are thereby operated and caused to close the circuits of the recorder-magnets L and J. Should a series or succession of signals each of the value of four and in the negative direction be thus transmitted, the condenser $K^2$ will become gradually charged up, and thereby cause a loss of signaling-current. This loss is overcome by the local correction-circuit, as follows: Current leaves the center of the battery O, passes through the local correction-circuit and the coil D in the same direction as the signaling-current, and returns through the resistance $R^2$, armature-lever $g$, one side of the battery N, from the center of the battery N to the resistance R', and thence through the armature-lever $i$ to the battery O.

As above stated, the shaft carrying the cam P runs synchronously with the transmitting instruments, and the nose $p$ is arranged to operate the lever $p^2$ so as to close the circuits of the secondary relays only when the tongue $d$ has reached its point of maximum deflection. It is therefore impossible for the tongue $d$ while sweeping over intermediate sections of the rotary drum between the zero-section $e$ and the maximum point of deflection to operate any of the secondary relays controlled by such intermediate sections.

$R^*$ is a resistance which short-circuits the contact-pieces $p^1 p^{10}$ and which permits sufficient current to pass to energize the magnet Q, so as to attract the armature $q$ when the tongue $d$ of the receiving-relay makes contact with any one of the conductive sections of its rotary contact. The said resistance does not, however, permit sufficient current to pass to cause the secondary-relay magnets F, G, H, or I to attract their armatures. The armature $q$ is therefore always attracted by the magnet Q, and the clutch is permitted to continue to rotate until the receiving-relay tongue $d$ returns to zero. Therefore when a series or succession of signaling-currents of the same sign are received by the receiving-relay and the tongue $d$ does not return to zero after every signal the cam P would merely continue to revolve until the said series of signals ceased and the tongue returned to zero, the nose $p$ operating the lever $p^2$ and the contacts carried by said lever once during every revolution of the cam P and at the middle of every signaling-current and the correct number of signaling impulses being thus correctly recorded by the secondary relays.

Referring to Fig. $1^b$, $m$ is a centrally-pivoted armature adapted to be rocked by the electromagnets M L when energized as above described. This armature carries a pen or tongue $m'$, which may be the siphon of a siphon-recorder, and $m^4$ $m^4$ are springs for returning the armature $m$ to its zero position after it has been rocked. When the armature $m$ is rocked by one or other of the magnets M or L, the tongue $m'$ writes signals on one or other side of the central longitudinal zero-line of a tape $m^2$, which travels over a roller $m^3$ and upon which the point of the tongue $m'$ rests. The recorder-magnets K J control another recording instrument of the same construction as that described in Fig. $1^b$. It will thus be seen that each set of secondary relays works a separate recording instrument and that only one recorder-magnet of each of the pairs M L and K J can be worked simultaneously.

Referring to Fig. $1^c$, $a^5$ is the escapement-wheel of the transmitter A, and $b^{11}$ is the escapement-wheel of the transmitter B. These escapement-wheels are respectively controlled by escapement-levers $a^9$ $b^{12}$, operated by electromagnets $a^{10}$ $b^{13}$ against the resistance of springs $a^{11}$ $b^{14}$. The windings of the magnets $a^{10}$ $b^{13}$ are included in the circuit of a battery $a^{12}$ and a tuning-fork $a^{13}$. The tuning-fork $a^{13}$ sends regular impulses of current through the windings of the electromagnets $a^{10}$ $b^{13}$, thereby operating the escapement-levers $a^9$ $b^{12}$, as is well understood.

It is obvious that in place of employing the rotary drum-contact, the secondary relays and recorders, and the contact-maker the tongue $d$ might be the tongue or pen of a siphon-recorder, in which case the moving tape on which the signals would be recorded would be ruled with a number of parallel longitudinal lines arranged symmetrically on either side of a central longitudinal zero-line, the distances between the lines each being equal to the width of one of the sections of the drum shown in Fig. 1. In the present instance there would be four of such lines on each side of the central zero-line, and the received signals could then be easily read from the amplitude of the movement of the recorder-tongue. The diagram Fig. 2 shows such a tape on an enlarged scale. The signal-line marked on this tape indicates the record that would be made by the pen of the siphon-recorder if both the transmitters A and B were working together. This signal-line is therefore a compound line, and if split up into its component parts these parts would be represented by the diagrams shown in Figs. 3 and 4, Fig. 3 representing the signals sent by the transmitter A, and Fig. 4 representing the signals sent by the transmitter B. It will therefore be seen that the movements of the pen of the siphon-recorder would be the same as the movements of the tongue $d$, Fig. 1, the moving tape merely replacing the rotary drum. The tape shown in Figs. 2, 3, and 4 is also provided with transverse lines, as these lines facilitate the reading of the signals.

Instead of connecting the local correcting-circuit to the coil D, as shown in Fig. 1, the primary relay may, as shown in Fig. 5, comprise two coils D and $D^2$, each suspended in a magnetic field. The coil D is connected to the cable or line and adapted to work the relay, as above described. The coil $D^2$ is a heavy or damped governing-coil consisting of a winding on a metal frame and is included in the correcting-circuit controlled by the secondary relays. The coils D and $D^2$ are connected by springs $d^3$ $d^3$.

In Fig. 6 a modification is shown in which the local correction-circuit L' L' and the main line C E are both connected to windings on the coil D of the primary relay, as in Fig. 1. The main line is also connected to the winding on the coil D, to which the local circuit is connected. $I^2$ is a closed-circuited magnetic coil placed between the cable C and the winding on the coil D, to which the local correction-circuit is connected. $K^2$ is the usual receiving-condenser shunted by a high resistance $R^3$, which, if the condenser $K^2$ becomes charged up or polarized by a combination of signals of the same sign, permits the charge in the cable to flow past the said condenser. This shunt $R^3$ may permit earth currents, if violent, to pass the condenser; but should this occur such earth-currents being steady will pass the coil $I^2$, and will therefore flow through both the windings of the coil D. Each of the windings on the coil D is wound in the opposite direction to the other, and therefore the earth-currents will not cause the coil to move. The local correction-batteries are so connected to the leads L' L' that the local correction-currents flow through the coil D in the same direction as the signaling-currents, as above described with reference to Fig. 1. Very little of the quickly-changing signaling-currents, however, passes the coil I², the bulk of the signaling-current passing through only one of the windings of the coil D and causing the said coil to move and operate the relay-tongue $d$, as above described. Any part of the signaling-current passing through the coil I², however, would cause a loss of movement in the coil D, as such current would pass through the coil D in the reverse direction to the main part of the signaling-current passing through the other winding of said coil; but this loss of movement is corrected by the local apparatus or relays then in turn sending a correcting-current through the line L' L' in the same direction as the main part of the signaling-current, and thus correcting or counteracting the effect of any of the signaling-current that may have passed through the coil I².

Referring to Fig. 7, the cable and artificial line are duplexed on what is known as "Harwood's" method. Any other method of duplexing the cable may be employed; but I consider Harwood's well-known method to be very convenient with this embodiment of my invention. The artificial line C' is made equal to the cable C in every respect. The two condensers K² K² are equal in every respect. The coil D is connected to a neutral point in the line as regards the sending-battery, but not to a neutral point with regard to the received signaling-currents. This very old and well-known method of balancing a cable is described in Charles Bright's book on "*Submarine Telegraphs*," Chapter III, page 657, also in "*Traite de Telegraphie Sous-Marine*," Chapter XXI, page 533. A and B are the transmitters, provided with batteries A' B' and signaling-levers $a$ $a'$ $b$ $b'$. D is the coil of the receiving-relay suspended in a magnetic field and adapted to operate a tongue $d$, which slides on the rotary drum-contact. I' is a closed-circuited magnetic coil arranged as a shunt to the coil D, and D' is the relay-battery, arranged substantially as above described with reference to Fig. 1. K² K² are the usual receiving-condensers. C is the cable, and C' is the artificial line. S, T, U, and V are the electromagnets, and $s$, $t$, $u$, and $v$ are the armatures of the secondary relays. The armature $s$ carries a contact $s'$, adapted to oscillate between fixed contacts $s^2$ $s^3$ and normally held against the contact $s^3$ by a spring $s^4$. The armature $t$ carries a contact $t'$, adapted to oscillate between fixed contacts $t^2$ $t^3$ and normally held against the contact $t^3$ by a spring $t^4$. The armature $u$ carries a contact $u'$, adapted to oscillate between fixed contacts $u^2$ $u^3$ and normally held against the contact $u^3$ by a spring $u^4$. The armature $v$ carries a contact $v'$, adapted to oscillate between fixed contacts $v^2$ $v^3$ and normally held against the contact $v^3$ by a spring $v^4$. $s^5$ $t^5$ $u^5$ $v^5$ are rotary clutches or cams preferably of the kind described in the specification of my prior patent, No. 681,617. These cams carry noses $s^6$ $t^6$ $u^6$ $v^6$ and radial pins $s^7$ $t^7$ $u^7$ $v^7$. These radial pins normally engage similar pins on the armatures $s$, $t$, $u$, and $v$ to hold the clutches $s^5$ $t^5$ $u^5$ $v^5$ stationary. $s^8$ $t^8$ $u^8$ $v^8$ are pivoted levers having their arms on one side carrying rollers which lie in the paths of the noses $s^6$ $t^6$ $u^6$ $v^6$. The other arms of these levers carry contacts which are normally held against fixed stops by suitable springs. W, X, Y, and Z are the recorder-magnets. O' and N' are the local correction-batteries, and K³ R⁴ are respectively condensers and resistances in the local circuit for connecting the movements of the coil D to overcome "varying zero," as above described. R⁵ R⁶ are resistances in the circuits of the batteries O' N'. When signaling-currents are transmitted by the transmitters A and B and circulate through the coil D, the said coil turns in the magnetic field in which it is suspended and moves the free end of the tongue $d$ from the central section onto one or other of the other sections of the rotary contact, according to the strength of the signal, and consequently the amplitude of movement of the coil D, as above described with reference to Fig. 1. When the tongue $d$ is thus moved, say, onto the section $e'$ of the rotary drum, a current passes from the battery D' through the top winding on the magnet S and back through a suitable brush, the section $e'$, and the tongue $d$ to the opposite pole of the battery D'. The magnet S is thus energized and attracts the armature $s$. The armature $s$ when thus attracted moves the contact $s'$ against the contact $s^2$ and away from the contact $s^3$ and simultaneously releases the pin $s^7$, so that the clutch $s^5$ is permitted to rotate in the direction of the arrow, and the nose $s^6$ operates the lever $s^8$, so as to close the contacts $s^9$ $s^{10}$. The contacts $s^9$ $s^{10}$ and $s'$ $s^2$ being then closed at the same time, a current passes from the battery of the recorder W through the contacts $s^2$ $s'$, the armature $s$, the contacts $s^9$ $s^{10}$, and through the recorder-magnet W back to the said battery, the recorder operated by the magnet W being thus caused to register a signal. If the tongue $d$ is moved by the signaling-current onto the section $e^3$, a circuit is closed from one pole of the battery D' through the middle windings of the magnets T and U. The armatures $t$ and $u$ are thus caused to close the contacts $t'$ $t^2$ and $u'$ $u^2$ and to release the clutches $t^5$ $u^5$. The noses $t^6$ $u^6$ then operate the levers $t^8$ $u^8$ and close the contacts $t^9$ $t^{10}$ and $u^9$ $u^{10}$. The recorder-magnets X and Y are thus energized and cause their respective recorders to register signals. If the tongue $d$ is moved by the signaling-current into the section $e^5$ of the rotary drum-contact, a current passes from the battery D' through the top winding of the magnet U and then through a suitable brush, the section $e^5$, and the tongue $d$ back to the battery $D'$, the recorder-magnet Y being thus operated alone. If the tongue $d$ is moved onto the drum-section $e^7$, a circuit is closed between the battery $D'$ through the bottom windings of the magnets S and U and back through a suitable brush, the drum-sections $e^7$, and the tongue $d$ to the battery $D'$. The recording-magnets W and Y are thereby operated, as above described. If the tongue $d$ is moved onto any of the drum-sections $e^2$, $e^4$, $e^6$, or $e^8$, the recorders W, X, Y, and Z are similarly operated, as above described. For instance, if the tongue $d$ is moved by the signaling-current onto the drum-section $e^6$ a current passes from the battery $D'$ through the top winding on the magnet V and back through a suitable brush, the said section $e^6$, and the tongue $d$ to the battery $D'$. The armature $v$ is then attracted and moves the contact $v'$ onto the contact $v^2$ and releases the pin $v$. The clutch $v^5$ then rotates, and the nose $v^6$ operates the lever $v^8$, so as to close the contacts $v^9 v^{10}$. The circuit of the recorder-magnet Z is thereby closed and a signal recorded. Each pair of recorder-magnets W X and Y Z operate a recording instrument of the same construction as that described with reference to Fig. $1^b$. The batteries $O'$ and $N'$ are worked in a similar manner to the batteries O and N in Fig. 1. When no signaling-currents are received, no current for the correction of varying zero is sent through the coil D, the current from the battery $O'$ passing through the armature $u$, the contacts $u' u^3$, the resistance $R^5$, the contacts $v^3 v'$, and the armature $v$ back to the battery $O'$, and the current from the battery $N'$ passing through the armature $s$, the contacts $s' s^3$, the resistance $R^6$, the contacts $t^3 t'$, and the armature $t$ back to the battery $N'$. Each side of the battery $O'$ is relatively to each side of the battery $N'$ as the battery $A'$ is to the battery $B'$, and the condensers $K^3$ and resistances $R^4$ in the local correction-circuit are arranged to afford the same time retardation to the current from the batteries $O' N'$ as the charging-up effect of the cable C and condensers $K^2$, due to a series or combination of signals of the same sign, offers to the sending-batteries $A'$ and $B'$. The batteries $N'$ and $O'$ are so connected to the coil D that they send their currents through said coil in the same direction to the signaling-currents. Therefore when one of the armatures $s, t, u$, or $v$ is operated as above described a correcting-current is, if a combination of signals of the same sign and strength are received, sent through the coil D from the batteries $O' N'$, which current produces the same variable effect in the coil D, but in the opposite direction to the variable effect produced by the main cable-currents—that is to say, the combination of signals causes a loss of current, owing to part of said current being utilized to charge up the condenser $K^2$, and the current from the batteries $O' N'$ makes up for this loss, and therefore moves the tongue $d$ onto the correct section of the rotary drum-contact. For instance, when the armature $v$ is attracted for signals of the value of plus three, as above described, and closes the contacts $v' v^2$ a current passes from the battery $O'$ through the contacts $u' u^3$, the resistance $R^5$, the battery $N'$, the armature $s$, the contacts $s' s^3$, and through the contacts $t' t^3$, if both sides of the battery $N'$ are evenly balanced, the resistance $R^6$, and the coil D, and thence back to the battery $O'$. When the armature $u$ is attracted by signals of the value of minus three, current passes from the center of the battery $O'$ through the local correction-circuit and the coil D, returning through the resistance $R^6$, the contacts $s^3 s'$, armature $s$, and contacts $t^3 t'$, and armature $t$ to the center of the battery $N'$, if both sides of the battery $N'$ are evenly balanced, and thence through the resistance $R^5$, the contacts $v^3 v'$, and armature $v$ to the battery $O'$. When the armature $t$ is attracted by signals of the value plus one, current passes from the battery $N'$ through the armature $s$, contacts $s' s^3$, resistance $R^6$, the local correction-circuit, and the coil D, returning to the center of the battery $O'$ through the armatures $v$ and $u$ and the contacts $v' v^3$ and $u' u^3$, if both sides of the battery $O'$ are evenly balanced, and thence through the resistance $R^5$ to the center of the battery $N'$. When the armature $s$ is attracted by signals of the value of minus one, current passes from the center of the battery $N'$ through the resistance $R^5$, the contacts $u^3 u'$, and $v^3 v'$, the armatures $u$ and $v$, both sides of the battery $O'$, if the sides of said battery are evenly balanced, from the center of the battery $O'$, through the local correction-circuit and the coil D, and back through the resistance $R^6$, the contacts $t^3 t'$, and the armature $t$ to the battery $N'$. When the armatures $v$ and $t$ are simultaneously attracted by signals of the value of four, (three plus one,) current passes from the battery $N'$, through the armature $s$, contacts $s' s^3$, resistance $R^6$, the local correction-circuit and coil D, and returns to the center of the battery $O'$ through one half of said battery, the armature $u$, contacts $u' u^3$, and resistance $R^5$ to the center of the battery $N'$, the battery $N'$ thus reinforcing the battery $O'$. When the armatures $u$ and $s$ are simultaneously attracted by signals of the value of minus four, (minus three and minus one,) current passes from the center of the battery $O'$, through the local correction-circuit and the coil D, and returns by the resistance $R^6$, contacts $t^3 t'$, armature $t$, one half of the battery $N'$ to the center of said battery, and thence by the resistance $R^5$, contacts $v^3 v'$, and armature $v$ to the battery $O'$, the battery $N'$ reinforcing the battery $O'$. When the armatures $v$ and $s$ are simultaneously attracted by signals of the value of two, (three minus one,) current passes from the battery $O'$, through the armature $u$, contacts $u'$ $u^3$, and resistance $R^5$ to the center of the battery $N'$, thence in the reverse direction through one half of the battery $N'$, the armature $t$, contacts $t'$ $t^3$, resistance $R^6$, local correction-circuit and coil D, returning to the center of the battery $O'$, the battery $N'$ opposing the battery $O'$. When the armatures $u$ and $t$ are simultaneously attracted by currents of the value of minus two, (minus three plus one,) current passes from the center of the battery $O'$, through the local correction-circuit and coil D, returning by the resistance $R^6$, contacts $s^3$ $s'$, armature $s$, in the reverse direction through one side of the battery $N'$, from the center of the battery $N'$ to the resistance $R^5$, contacts $v^3$ $v'$, and armature $v$ to the battery $O'$, the battery $N'$ opposing the battery $O'$.

When employing the arrangement of the secondary relays shown in Fig. 7, it is not absolutely necessary to employ a contact-maker such as that operated by the clutch P in Fig. 1, for the following reason: In order that the circuits of the recorders W, X, Y, or Z may be closed, it is necessary that the armatures of the magnets S, T, U, or V should be held attracted during the time that the noses on the corresponding rotary clutches operate the levers that lie in their path, so that although the tongue $d$, when sweeping over intermediate sections of the rotary contact-drum before reaching its maximum deflection, may momentarily energize the electromagnets included in the circuits of such intermediate sections; yet the passage of the tongue $d$ across the surface of the rotary contact is so rapid that the circuits of such electromagnets will be again opened before the noses of their corresponding clutches have time to operate their levers. For instance, if the tongue $d$ sweeps over the section $e'$ onto the section $e^3$ the magnet S will be first momentarily energized and attract its armature, so as to close the contacts $s'$ $s^2$ and release the clutch $s^5$. By the time the nose $s^7$, however, reaches the roller carried by the lever $s^8$ the tongue $d$ has passed onto the section $e^3$ and the armature $s$ has been released, so that when the contacts $s^9$ $s^{10}$ are closed the contacts $s'$ $s^2$ are open and the recorder W is not operated.

I may modify the contacts operated by the electromagnets S, T, U, and V in order to regulate the time and length of contact. In Fig. 8 such a contact is shown as inserted between the secondary relay V and the recorder W.

Referring to Fig. 8, $v$ is the armature of the magnet V and is included in the circuit of an electromagnet $V'$, provided with a pivoted armature $v^{12}$, having a pin which normally engages the pin $v^7$ of the cam $v^5$, which is in this case shown in the form of a snail-cam. 1 and 2 are the lines leading to the recorder Z. 3 is a pivoted lever one arm of which carries a roller lying in the path of the clutch $v^5$ and the other arm of which carries a contact 4, which is normally held against a fixed stop by a suitable spring. 5 is a pivoted lever one arm of which is normally held against a fixed stop 6 and has its movement limited by an adjustable stop 7. The other arm of the lever 5 carries a contact 8, which rests upon a pivoted lever 9. A suitable spring tends to press the lever 9 against the contact 8, so as to hold the lever 5 against the stop 6 when no signaling-current is received. When the magnet V is energized by the tongue $d$ moving onto certain sections of the rotary drum-contact of the receiving-relay, as above described, the armature $v$ moves onto a stop $v^{11}$ and closes the circuit of the magnet $V'$. The magnet $V'$ then attracts the armature $v^{12}$, causing one of its arms to release the clutch $v^5$ and its other arm to move onto a stop $v^{13}$. The clutch $v^5$ then rotates and operates the lever 3, so as to move the contact 4 onto the lever 9. The circuit of the recorder Z is thus closed through the line 1, the lever 5, contact 8, lever 9, contact 4, lever 3, contact $v^{13}$, lever $v^{12}$, and line 2, and a signal thereby recorded. When the stop 4 strikes the lever 9, as above described, the lever 9 is caused to rock, the lever 5 being caused by a spring to follow such rocking movement until the one arm of the lever 5 strikes the adjustable stop 7. As the lever 3 and stop 4 then continue to rock the lever 9 the said lever moves away from the stop 8, and thereby opens the circuit of the recorder Z. Therefore by adjusting the position of the stop 7 the length of the contact can be regulated. By adjusting the position of the lever 3 with reference to the clutch $v^5$ the time when the lever 3 will be operated during the revolution of the snail-cam can be regulated.

Referring to Fig. 9, $A'$ and $B'$ are the transmitting-batteries, adapted to work in series, as previously described. C represents the cable, and E is a conductor leading to earth. $a$ $a'$ $b$ $b'$ are the signaling-levers. 11 and 12 are the needles for operating the levers $a$ $a'$ through the intervention of cranked levers 15 16, and 13 14 are the needles for operating the levers $b$ $b'$ through the intervention of cranked levers 17 18. The needles 11, 12, 13, and 14 are the usual needles employed in an automatic transmitter which is operated by a perforated tape, as described in prior patent, No. 577,540, to Taylor. 19 is the traveling perforated tape, provided with a central row of perforations with which a toothed wheel 20 engages to drive the tape and with lateral signaling-perforations for operating the needles 11, 12, 13, and 14. For the sake of clearness the free ends of these needles are not shown as bearing on the tape and engaging the lateral perforations, as they do in actual practice. The toothed wheel 20 is mounted on a rotary shaft 21, which also carries a ratchet-wheel 22. Loosely mounted on the shaft 21 is a sleeve 23, which carries a crank-arm 24, and also an arm 25, to which is pivoted a pawl 26, adapted to engage the teeth of the ratchet-wheel 22. 27 is a reciprocating rod connecting the crank 24 to any suitable source of power. As the rod 27 reciprocates it causes the pawl 26 to rotate the ratchet-wheel 22 and shaft 21. The teeth of the wheel 22 are so arranged that for every throw of the crank 24 the wheel 20 moves the tape forward through a space equal to that of two of the central perforations in said tape. If the wheel 22 thus throws the signaling-tape forward by a step-by-step movement and through a distance of two signaling-spaces at each throw, each needle will be capable of being operated by signaling-holes in alternate signaling-spaces on the tape, and thus two messages can be simultaneously transmitted. The signals are sent to cable or to earth and are received and recorded, as above described with reference to Fig. 1 or to Fig. 7.

Referring to Fig. 9$^a$, which shows the two transmitters mechanically coupled, so as to insure that they shall run in step, A and B represent the two transmitters provided with a single driving shaft or spindle $a^{14}$, on which is mounted a motor-armature $a^{15}$, situated in the field of a suitable electromagnet $a^{16}$. The two transmitters are thus simultaneously driven by a single motor.

According to the above-described invention it is theoretically possible to extend the system by using three or more transmitters and three or more receivers; but the difficulties arising in practice and the degree of refinement required in the instruments would seem to advance as the square of the number of transmitters and receivers employed.

What I claim, and desire to secure by Letters Patent of the United States, is—

1. In a system of electric telegraphy, the combination with the line or cable, of a plurality of transmitting instruments, a corresponding number of batteries adapted to be worked in series by said transmitting instrument, a corresponding number of recording instruments actuated by the combined effect of positive and negative impulses simultaneously transmitted by the transmitting instruments and adapted to simultaneously register signals on one or other side of their zero-lines in accordance with the polarity or direction of the currents leaving their respective transmitting instruments, substantially as described.

2. In a system of electric telegraphy, the combination with the line or cable, of a plurality of transmitting instruments, a corresponding number of batteries each of different signaling power and adapted to be worked in series by said transmitting instruments, a corresponding number of recording instruments actuated by the combined effect of positive and negative impulses simultaneously transmitted by the transmitting instruments and adapted to simultaneously register signals on one or other side of their zero-lines in accordance with the polarity or direction of the currents leaving their respective transmitting instruments, substantially as described.

3. In a system of electric telegraphy, the combination with the line or cable, of a plurality of transmitting instruments, a corresponding number of batteries adapted to be worked in series by said transmitting instruments, a suspended coil-relay adapted to be moved onto one or other side of its zero-line by the effect of combined signaling currents from the transmitting-batteries, and means operated by said relay for simultaneously and separately recording the signals sent by each transmitting instrument, substantially as described.

4. In a system of electric telegraphy, the combination with the line or cable, of a number of transmitting instruments, a corresponding number of batteries adapted to be worked in series by said transmitting instruments, a relay adapted to be worked by the arrival signaling currents, a closed-circuited inductive-coil short-circuiting said relay, and means operated by the said relay for separately recording the signals sent by each of the transmitting instruments, substantially as described.

5. In a system of electric telegraphy, the combination with the line or cable and the receiving-condenser, of a plurality of transmitting instruments, a corresponding number of batteries adapted to be worked in series by said transmitting instruments, a relay adapted to be worked by the effect of the combined signaling-currents from the transmitting-batteries, means operated by said relay for simultaneously and separately recording the signals sent by each transmitting instrument, and means operated by said relay for sending a local current through said relay to make up any loss of current caused by the gradual charging-up of the receiving-condenser by part of a succession of received signaling-currents each of the same sign and value, substantially as described.

6. In a system of electric telegraphy, the combination with the line or cable, of a plurality of transmitting instruments, a corresponding number of batteries each of different signaling power and adapted to be worked in series by the transmitting instruments, a receiving-relay adapted to be moved onto one or other side of its zero-line by the effect of combined signaling-currents from the transmitting-batteries, and means operated by the receiving-relay for simultaneously and separately recording, in accordance with the amplitude of the movement of the said relay, the signals simultaneously sent by each transmitting instrument, substantially as described.

7. In a system of electric telegraphy, the combination with the line or cable, of a number of transmitting instruments, a corresponding number of batteries each of different signaling power adapted to be worked in series by said transmitting instruments, a receiving-relay adapted to be operated by the arrival signaling-currents, means operated by the amplitude of the movement of the tongue of said relay for separately recording the signals sent by each of the transmitting instruments, and means operated by said relay for sending a local current through said relay to overcome "varying zero," substantially as described.

8. In a system of electric telegraphy, the combination with the line or cable, of a number of transmitting instruments, a corresponding number of batteries each of different signaling power adapted to be worked in series by the said transmitting instruments, a receiving-relay adapted to be operated by the arrival signaling-currents, a closed circuited inductive-coil short-circuiting said relay, means operated by the amplitude of the movement of the tongue of said relay for separately recording the signals sent by each of the said transmitting instruments, and means operated by the said relay for sending a local current through said relay to overcome "varying zero," substantially as described.

9. In a system of electric telegraphy, the combination with the line or cable, of a number of transmitting instruments, a corresponding number of batteries adapted to be worked in series with one another by said transmitting instruments, a relay adapted to be worked by the arrival-signaling currents, a rotary contact provided with sections insulated from one another and upon the surface of which the tongue of the said relay bears, and means connected to the sections of said rotary contact for separately recording the signals sent by each of the said transmitting instruments, substantially as described.

10. In a system of electric telegraphy, the combination with the line or cable, of a number of transmitting instruments, a corresponding number of batteries adapted to be worked in series with one another by said transmitting instruments, a relay adapted to be worked by the arrival-signaling currents, a rotary contact provided with sections insulated from one another and upon the surface of which the tongue of the said relay bears, means connected to the sections of said rotary contact for separately recording the signals sent by each of the said transmitting instruments and for sending a local current through said relay to overcome "varying zero," substantially as described.

11. In a system of electric telegraphy, the combination with the line or cable, of a number of transmitting instruments, a corresponding number of batteries adapted to be worked in series by said transmitting instruments, means for receiving the signaling-currents and separately recording the signals sent by each of the said transmitting instruments, local batteries at the receiving end of the said line or cable which batteries are connected in series and have their circuits arranged to include the said receiving means, means included in the circuits of said local batteries for producing the same time retardation to the currents from said batteries as the line or cable affords to the signaling-currents, and means for operating the said local batteries when signaling-currents are received, substantially as described.

12. In a system of electric telegraphy, the combination with the line or cable, of a number of transmitting instruments, a corresponding number of batteries adapted to be worked in series with one another by the said transmitting instruments, a relay adapted to be worked by the arrival-signaling currents, local batteries connected in series and having their circuits arranged to include the coil of the said relay, means included in the circuits of said batteries for producing the same time retardation to the currents from said batteries as the line or cable affords to the signaling-currents, means operated by the said relay for separately recording the signals received from each of the transmitting instruments, and means operated by said relay for closing the circuit of the local batteries when signaling-currents are received so as to send a current from said local batteries through the coil of the said relay in the same direction to that in which the signaling-currents pass through said relay, substantially as described.

13. In a system of electric telegraphy, the combination with the line or cable, of a number of transmitting instruments, a corresponding number of batteries adapted to be worked in series by said transmitting instruments, a receiving-relay adapted to be moved on both sides of its zero-line worked by the arrival-signaling currents, secondary relays adapted to be worked by the said receiving-relay, and means operated by the secondary relays for separately recording the signals received from each of the transmitting instruments, substantially as described.

14. In a system of electric telegraphy, the combination with the line or cable, of a number of transmitting instruments, a corresponding number of batteries adapted to be worked in series by said transmitting instrument, a receiving-relay adapted to be worked by the arrival-signaling currents, secondary relays adapted to be worked by the said receiving-relays for sending a current through the receiving-relay to overcome varying zero, and means operated by the secondary relays for separately recording the signals received from each of the transmitting instruments, substantially as described.

15. In a system of electric telegraphy, the combination with the line or cable, of a number of transmitting instruments, a corresponding number of batteries adapted to be worked in series by the transmitting instruments, a receiving-relay adapted to be worked by the arrival-signaling currents, a rotary contact provided with sections insulated from one another and on the surface of which the tongue of the receiving-relay bears, secondary relays connected to the sections of said rotary contact, and means operated by said secondary relays for separately recording the signals sent by each of the transmitting instruments, substantially as described.

16. In a system of electric telegraphy, the combination with a line or cable, of a number of transmitting instruments, a corresponding number of batteries each of different signaling power and adapted to be worked in series by the transmitting instruments, a receiving-relay adapted to be worked by the arrival-signaling currents, a rotary contact provided with sections insulated from one another and upon which the tongue of the receiving-relay bears, recorders connected to the sections of said rotary contacts for separately recording the signals sent by each of the said transmitting instruments, and a contact-maker interposed between the sections of the said rotary contact and the recorders and operated by the receiving-relay in such manner that it closes the circuit of the recorders only when the tongue of the receiving-relay reaches its point of maximum deflection, substantially as described.

17. In a system of electric telegraphy, the combination with the line or cable, of a number of transmitting instruments, a corresponding number of batteries each of different signaling power and adapted to be worked in series by the transmitting instruments, a receiving-relay adapted to be worked by the arrival-signaling currents, a rotary contact provided with sections insulated from one another and upon the surface of which the tongue of the receiving-relay bears, secondary relays connected to the sections of the rotary contact, a contact-maker interposed between the sections of the rotary contact and the secondary relays and adapted to operate in such manner that the secondary relays are operated only when the tongue of the receiving-relay reaches its point of maximum deflection on the surface of the rotary contact, and means operated by said secondary relays for separately recording the signals transmitted by each of the transmitting instruments, substantially as described.

18. In a system of electric telegraphy, the combination with the line or cable, of a number of transmitting instruments, a corresponding number of batteries each of different signaling power and adapted to be worked in series by the transmitting instruments, a receiving-relay adapted to be worked by the arrival-signaling currents, a rotary contact provided with sections insulated from one another and upon which the tongue of the receiving-relay bears, secondary relays connected to the sections of the rotary contact, a contact-making lever interposed between the secondary relays and the sections of the rotary contact, an electromagnet also interposed between the sections of the rotary contact and the secondary relays, an armature adapted to be operated by said electromagnet, a rotary cam which is normally held stationary by said armature but is released and operates the contact-making lever when the said electromagnet is energized in such manner that only such secondary relay or relays are operated as are connected to the section of the rotary contact upon which the tongue of the receiving-relay bears when it reaches its point of maximum deflection, and means operated by the secondary relays for separately recording the signals sent by each of the transmitting instruments, substantially as described.

19. In a system of electric telegraphy, the combination with the line or cable, of a number of transmitting instruments, a corresponding number of batteries each of different signaling power and adapted to be worked in series by the transmitting instruments, a receiving-relay adapted to be worked by the arrival-signaling currents, a rotary contact provided with sections insulated from one another and upon which the tongue of the receiving-relay bears, secondary relays connected to the sections of the rotary contact, a contact-making lever interposed between the secondary relays and the sections of the rotary contact, an electromagnet also interposed between the sections of the rotary contact and the secondary relays, an armature adapted to be operated by said electromagnet, a rotary cam which is normally held stationary by said armature but is released and operates the contact-making lever when the said electromagnet is energized in such manner that only such secondary relay or relays are operated as are connected to the section of the rotary contact upon which the tongue of the receiving-relay bears when it reaches its point of maximum deflection, means operated by the secondary relays for sending a current through the receiving-relay to overcome "varying zero," and means operated by the secondary relays for separately recording the signals sent by each of the transmitting instruments, substantially as described.

20. In a system of electric telegraphy, the combination with the line or cable of a number of transmitting instruments, a corresponding number of batteries adapted to be controlled in series by said transmitting instrument, a receiving-relay adapted to be moved on both sides of its zero-line by the arrival-signaling currents, recording instruments operated by said receiving-relay, and means interposed between the receiving-relay and the recording instruments whereby said recording instruments are operated only at or about the middle of the arrival-signaling currents, substantially as and for the purpose specified.

21. In a system of electric telegraphy, the combination with the line or cable, of a pair of transmitting-batteries, a pair of transmitting instruments adapted to work said batteries in series with one another, a single perforated signaling-tape adapted to simultaneously operate both said transmitting instruments, means for receiving the signals, and means for separately recording the signals sent by each transmitting instrument, substantially as described.

22. In a system of electric telegraphy, the combination with the line or cable, of a pair of transmitting-batteries, two pairs of signaling-levers adapted to simultaneously work said batteries in series with one another, two pairs of needles adapted to operate said signaling-levers, a single perforated signaling-tape adapted to operate both pairs of said needles, means for receiving the signals, and means for separately recording the signals sent by each transmitting instrument, substantially as described.

23. In a system of electric telegraphy the combination with the line or cable, of a pair of transmitting-batteries, a pair of transmitting instruments adapted to work said batteries in series, a single perforated signaling-tape adapted to simultaneously operate said transmitting instruments, a toothed wheel engaging said tape, a rotatable shaft which carries said toothed wheel, a ratchet-wheel carried by said shaft, a sleeve loosely mounted on said shaft, a pawl carried by said sleeve and engaging the ratchet-wheel, a crank-arm carried by said sleeve, means for imparting reciprocating movement to said crank-arm, means for receiving the signals, and means for separately recording the signals sent by each of the transmitting instruments, substantially as described.

24. In a system of electric telegraphy the combination with the line or cable, of a pair of transmitting-batteries, two pairs of signaling-levers adapted to simultaneously work said batteries in series with one another, two pairs of needles adapted to work said signaling-levers, a single perforated signaling-tape adapted to operate both pairs of said needles, a toothed wheel engaging said tape, a rotatable shaft which carries said toothed wheel, a ratchet-wheel carried by said shaft, a sleeve loosely mounted on said shaft, a pawl carried by said sleeve and engaging the ratchet-wheel, a crank-arm carried by said sleeve, means for imparting reciprocating movement to said crank-arm, means for receiving the signals, and means for separately recording the signals sent by each of the transmitting instruments, substantially as described.

In testimony whereof I have hereunto set my hand, in presence of two subscribing witnesses, this 26th day of October, 1900.

SIDNEY GEORGE BROWN.

Witnesses:
THOMAS LELLY WARD,
G. F. WARREN.